United States Patent Office 2,958,211
Patented Nov. 1, 1960

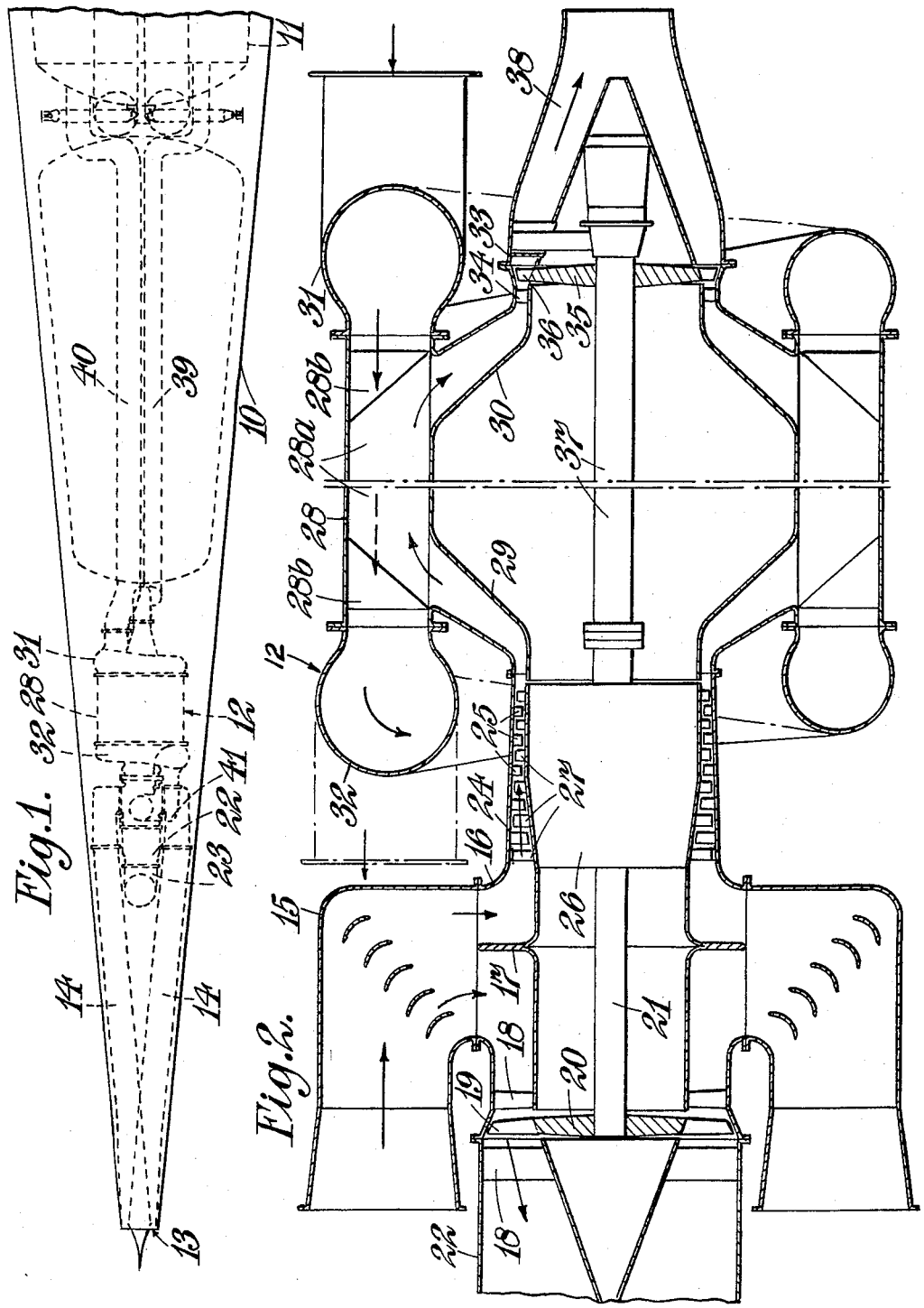

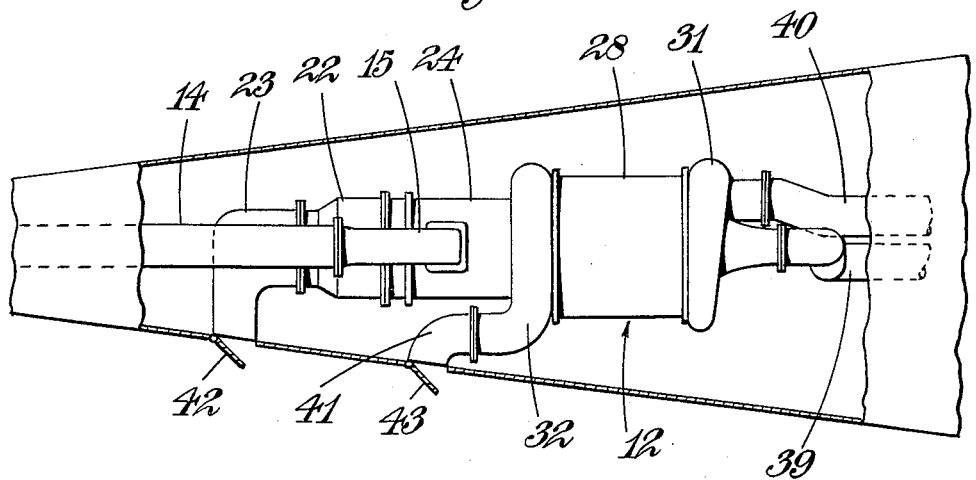

2,958,211

CABIN AIR SUPPLY MEANS FOR AIRCRAFT

Alan Arnold Griffith, Derby, England, assignor to Rolls-Royce Limited, Derby, England, a company of Great Britain Filed June 7, 1957, Ser. No. 664,429

Claims priority, application Great Britain June 11, 1956

7 Claims. (Cl. 62—402)

This invention comprises improvements in or relating to aircraft.

It is well-known that the temperature of the air flowing within a forwardly-facing air intake of an aircraft increases with the aircraft speed due to the kinetic heating effect, and that, irrespective of the ambient atmospheric temperature, at very high speeds the air temperature in the intake becomes so high that it is necessary to cool the air before it is used within a cabin of the aircraft.

It is an object of this invention to provide improved means for supplying cabin air in very high speed aircraft.

According to the present invention, there is provided, in or for an aircraft, cabin air supply means for an aircraft comprising an air intake means which in use is supplied with kinetically-heated air and which affords first and second air streams, a main air turbine connected to the air intake means to receive and to be driven by the first air stream, an air compressor drivingly connected to the air turbine and receiving the second air stream, a heat exchanger having a first flow path connected to receive air compressed in the compressor and a second flow path which in use is connected to receive air flowing from the aircraft cabin thereby to cool the air flowing in the first flow path, and an expansion turbine connected to receive air from the outlet of the first flow path through the heat exchanger, the air being expanded and cooled in the expansion turbine to a pressure and temperature suitable for delivery to the aircraft cabin.

When cabin air supply means as just set forth is employed in a triangular plan aircraft the components of the cabin air supply means are conveniently assembled as a unitary structure and unitary structure is accommodated forwards of the cabin to be supplied with ram air from an air intake provided in the nose of the aircraft, the expansion turbine and second flow path of the heat exchanger being connected to the cabin by ducting extending rearwards from the unitary structure, and the outlets of the main air turbine and the second flow path spilling to atmosphere through valve controlled outlets in the under surface of the aircraft.

Preferably, the expansion turbine is also drivingly connected to the compressor, and the two turbines and the compressor are coaxial and the heat exchanger is of annular form and encircles the compressor and a shaft joining the compressor and expansion turbine.

One construction of cabin air supply means of this invention will now be described with reference to the accompanying drawings in which—

Figure 1 is a plan view of the forward end of an aircraft showing the cabin air supply means, Figuer 2 is a diagrammatic axial section of the cabin air supply means, and Figure 3 is a side elevational view of the plant with part of the fuselage broken away.

The aircraft illustrated in designed for flight at 60,000 feet at Mach No. 2.5 and in plan is approximately an isoceles triangle of small apex angle. The aircraft body is indicated at 10 and it accommodates a cabin structure 11 the walls of which are isolated from the skin of the aircraft.

The cabin air supply means is a unitary structure 12 arranged forwards of the cabin 11, and the air supply to the unitary structure is through a forwardly-facing intake 13 of annular form at the nose of the aircraft body. The air intake 13 leads to a pair of rearwardly extending ducts 14 connected with the unitary structure.

The unitary structure 12 comprises (Figure 2) a pair of air entry elbows 15 connected to receive air from the ducts 14 and adapted to turn the incoming air towards the axis of the unitary structure. The outlet ends of the elbows 15 are secured to an air entry structure 16 wherein the incoming air from each elbow is divided into two streams by means of an annular partition 17 and wherein the two air streams are turned to flow axially in the forward and rearward directions respectively. The partition 17 is positioned so that a greater quantity of air flows in the forwardly-flowing stream than in the rearwardly-flowing stream; for instance it may be arranged that under design flight conditions, the incoming air, which is at a pressure of 11.45 pounds per square inch and has a temperature of 487° K., is divided to give a total forward air flow of 13 pounds per second and a rearward air flow of 8 pounds per second.

The forwardly-flowing air stream enters a main air turbine comprising inlet and outlet stator guide vanes 18, and rotor blades 19 mounted on a rotor disc 20 secured to a drive shaft 21, and the air exhausting from the turbine flows through an exhaust assembly 22 and an exhaust elbow 23 (Figures 1 and 3) containing an exhaust control valve 42 to atmosphere, the outlet from the control valve 42 being in the undersurface of the aircraft body 10.

The rearwardly-flowing air stream enters a multi-stage axial flow compressor having a stator casing 24 carrying stator blading 25 and a rotor drum structure 26 carrying rotor blading 27. The rotor drum structure 26 is secured to the shaft 21 so as to be driven by the main turbine. The compressor may for example be designed to have a compression ratio of 2.88:1 and to deliver (under design flight conditions) air at 33 pounds per square inch, this air having a temperature of 697° K.

The delivery end of the compressor is encircled by an annular heat exchanger 28 which has a first flow path 28a connected at the forward end to annular delivery ducting 29 of the compressor and connected at its rearward end to annular intake ducting 30 of an expansion turbine. The heat exchanger also has a second flow path 28b with inlet and outlet volutes 31, 32 respectively. The air from the compressor is cooled in the heat exchanger and, in the ducting 30, the air has a pressure of 31.3 pounds per square inch and a temperature of 362.5° K.

The expansion turbine comprises a casing 33 supporting nozzle guide vanes 34 and comprises also a rotor disc 35 carrying rotor blades 36 and connected by a shaft 37 to the compressor rotor drum 26. The air from the first flow path 28a of the heat exchanger 28 is expanded and cooled in the turbine to a pressure of 11.8 pounds per square inch and to a temperature of 285° K., and it flows from an exhaust assembly 38 of the expansion turbine into a duct 39 (Figure 1) which conveys the air to the cabin 11.

The air leaves the cabin 11 through a duct 40 and is delivered into the inlet volute 31 at a temperature of 295° K. and then flows through the second flow path 28b of the heat exchanger (to cool the air from the compressor) into the outlet volute 32. The outlet volute 32 has connected to it an elbow 41 containing a control valve 43 through which the cabin exhaust air flows to atmosphere, the outlet from the control valve 43 being in the undersurface of the aircraft body.

It will be clear from the foregoing description that the invention provides a simple and compact cabin air supply means suitable for very high speed aircraft.

I claim:

1. Cabin air supply means for an aircraft comprising an air intake means which in use is supplied with kinetically-heated air and which includes means dividing the incoming air into first and second air streams, a main air turbine having an inlet connected to the air intake means to receive and to be driven by the first air stream and having an outlet delivering to atmosphere, an air compressor drivingly connected to the main air turbine having an inlet connected to the air intake means to receive the second air stream, said air compressor being operative to compress the air to a pressure in excess of the pressure maintained within the cabin, a heat exchanger having a first flow path connected to receive air compressed in the compressor and a second flow path which in use is connected to receive air flowing from the aircraft cabin thereby to cool the air flowing in the first flow path, and an expansion turbine having an inlet connected to receive air from the outlet of the first flow path of the heat exchanger and an outlet from which the air is led to the cabin, the air being expanded and cooled in the expansion turbine to a pressure and temperature suitable for delivery to the aircraft cabin.

2. Cabin air supply means according to claim 1 wherein the expansion turbine is also drivingly connected to the compressor, and the two turbines and the compressor are coaxial and the heat exchanger is of annular form and encircles the compressor and a shaft joining the compressor and expansion turbine.

3. Cabin air supply means for an aircraft comprising an air intake means which in use is supplied with kinetically-heated air and which includes means dividing the incoming air into first and second air streams, a main air turbine having an inlet connected to the air intake means to receive and to be driven by the first air stream and having an outlet delivering to atmosphere, an air compressor drivingly connected to the main air turbine having an inlet connected to the air intake means to receive the second air stream, said air compressor being operative to compress the air to a pressure in excess of the pressure maintained within the cabin, a heat exchanger having a first flow path connected to receive air compressed in the compressor and a second flow path which in use is connected to receive air flowing from the aircraft cabin thereby to cool the air flowing in the first flow path, and an expansion turbine having an inlet connected to receive air from the outlet of the first flow path of the heat exchanger and an outlet from which the air is led to the cabin, the air being expanded and cooled in the expansion turbine to a pressure and temperature suitable for delivery to the aircraft cabin, the turbines, the compressor and the heat exchanger being secured together to form a unitary structure capable of being mounted in the aircraft as a unit, the unit having connections for ducting whereby it is connected to the air intake, the cabin and exhaust outlets.

4. Cabin air supply means according to claim 3, wherein the unitary structure has a pair of air entry elbows forming the air intake means and adapted to turn the air flow towards the axis of the unitary structure, said air entry elbows opening into the structure axially between the main turbine and the compressor, said means dividing the incoming air into first and second air streams being an annular partition, said partition extending between the air entry elbows and dividing the air flowing from the elbows into two streams, one of which streams is turned to flow to the main turbine and the other of which streams is turned in the opposite direction to enter the compressor.

5. Cabin air supply means according to claim 3, comprising a control valve, the main turbine being connected to exhaust to atmosphere through the control valve.

6. Cabin air supply means for an aircraft comprising air intake means which in use is supplied with kinetically heated air, said air intake means defining first and second air conducting paths, a main air turbine mounted for rotation in said first air conducting path by air passing through said first path, said first air conducting path being arranged to discharge to atmosphere air passing thereto after passage through the turbine, an air compressor mounted for rotation in said second air conducting path and being driven by said main air turbine, said compressor compressing air flowing in said second air conducting path to a pressure greater than the pressure required in the cabin, a heat exchanger mounted in said second air conducting path and having a first flow path receiving air compressed by said compressor, an expansion turbine mounted for rotation in said second air conducting path downstream of said heat exchanger and upstream of the cabin, said expansion turbine receiving air from the first flow path of the heat exchanger and expanding the air to the pressure required in the cabin, said heat exchanger also comprising a second air flow path to receive air flowing from the cabin.

7. An aircraft cabin air supply system comprising in combination with a pressurized cabin of the aircraft, air intake means which in use is supplied with kinetically heated air and a unit structure adapted to be mounted in the aircraft and to be connected with said intake and with said cabin, said unit structure comprising a pair of air-entry elbows connected to the air intake and adapted to turn the air flowing from the air intake towards the axis of the unit, an annular partition dividing air flowing from said elbows into two streams, one of said streams being turned by the partition to flow forwardly and the other stream being turned by the partition to flow rearwardly, a main air turbine on one side of said partition and receivnig one of said air streams to be driven thereby, an air compressor on the opposite side of said partition and receiving the other of said air streams, said air compressor being coaxial with and drivingly connected to said main air turbine, an annular heat exchanger coaxial with said compressor and having a first flow path connected with the outlet of the compressor, and said heat exchanger having a second flow path connected with the cabin to receive air which has been used in the cabin, an expansion turbine coaxial with said main air turbine and said compressor, said expansion turbine being on the side of the air compressor remote from the partition and being drivingly connected with the compressor, said expansion turbine having its inlet connected to receive air from said first flow path of the heat exchanger and having its outlet connected to deliver to the cabin, air being expanded and cooled in the expansion turbine to a pressure and temperature suitable for delivery to the cabin, and said annular heat exchanger encircling the compressor and the expansion turbine.

References Cited in the file of this patent

UNITED STATES PATENTS 2,477,932     King                   Aug. 2, 1949
2,767,561     Seeger                Oct. 23, 1956